(12) United States Patent
Woo et al.

(10) Patent No.: US 9,979,024 B2
(45) Date of Patent: May 22, 2018

(54) TRANSITION METAL-PYROPHOSPHATE ANODE ACTIVE MATERIAL, METHOD OF PREPARING THE SAME, AND LITHIUM SECONDARY BATTERY OR HYBRID CAPACITOR INCLUDING THE ANODE ACTIVE MATERIAL

(71) Applicant: LG Chem, Ltd., Seoul (KR)

(72) Inventors: Sang Wook Woo, Daejeon (KR); Ji Heon Ryu, Gyeonggi-do (KR); Eun Kyung Kim, Daejeon (KR); Je Young Kim, Daejeon (KR); Sang Jo An, Gyeonggi-do (KR); Min Young Hong, Incheon (KR)

(73) Assignee: LG Chem, Ltd. (KR)

( * ) Notice: Subject to any disclaimer, the term of this patent is extended or adjusted under 35 U.S.C. 154(b) by 648 days.

(21) Appl. No.: 14/540,335

(22) Filed: Nov. 13, 2014

(65) Prior Publication Data
US 2015/0072238 A1    Mar. 12, 2015

Related U.S. Application Data

(63) Continuation of application No. PCT/KR2014/008160, filed on Sep. 1, 2014.

(30) Foreign Application Priority Data

Sep. 4, 2013   (KR) .................. 10-2013-0106325

(51) Int. Cl.
*H01M 4/58* (2010.01)
*H01M 4/36* (2006.01)
(Continued)

(52) U.S. Cl.
CPC ........... *H01M 4/5825* (2013.01); *C01B 25/42* (2013.01); *H01M 4/366* (2013.01); *H01M 4/625* (2013.01);
(Continued)

(58) Field of Classification Search
CPC .... H01M 4/366; H01M 4/5825; H01M 4/625; H01M 10/0525; H01M 10/052
See application file for complete search history.

(56) References Cited

U.S. PATENT DOCUMENTS

| 8,808,918 B2 | 8/2014 | Jung et al. |
| 2009/0026413 A1 | 1/2009 | Patoux et al. |

(Continued)

FOREIGN PATENT DOCUMENTS

| CN | 102791625 A |   | 11/2012 |
| CN | 103094628 A | * | 5/2013 |

(Continued)

OTHER PUBLICATIONS

Lee, Gwang-Lee, et al., "Synthesis and Li electroactivity of Fe2P2O7 microspheres composed of self-assembled nanrods." Ceramics International, vol. 38, No. 8, Dec. 1, 2012, pp. 6927-6930.

(Continued)

*Primary Examiner* — Basia A Ridley
*Assistant Examiner* — Heng M. Chan
(74) *Attorney, Agent, or Firm* — Lerner, David, Littenberg, Krumholz & Mentlik, LLP (57) ABSTRACT

Provided is an anode active material including a transition metal-pyrophosphate of Chemical Formula 1 below:

$M_2P_2O_7$     <Chemical Formula 1> where M is any one selected from the group consisting of titanium (Ti), chromium (Cr), manganese (Mn), iron (Fe), cobalt (Co), nickel (Ni), ruthenium (Ru), palladium (Pd), and silver (Ag), or two or more elements thereof.

Since the anode active material of the present invention is stable and has excellent conversion reactivity while including only transition metal and phosphate without using lithium in which the price thereof is continuously increased, (Continued)

the anode active material of the present invention may improve capacity characteristics.

25 Claims, 4 Drawing Sheets (51) Int. Cl.
C01B 25/42 (2006.01)
H01M 4/62 (2006.01)
H01M 10/0525 (2010.01)

(52) U.S. Cl.
CPC ...... *H01M 10/0525* (2013.01); *Y02T 10/7011* (2013.01)

(56) References Cited

U.S. PATENT DOCUMENTS

2010/0209782 A1 8/2010 Choi et al.
2012/0328774 A1 12/2012 Liang et al.
2013/0316233 A1 11/2013 Hirayama et al.

FOREIGN PATENT DOCUMENTS

| EP | 2546194 | A1 | | 1/2013 |
|----|---------|----|----|--------|
| JP | H10233208 | A | | 9/1998 |
| JP | 2009531265 | A | | 9/2009 |
| KR | 10-0814826 | B1 | | 3/2008 |
| KR | 20100078440 | A | | 7/2010 |
| KR | 20100094330 | A | | 8/2010 |
| KR | 20110054888 | A | * | 5/2011 |
| KR | 2013-0057412 | A | | 5/2013 |
| KR | 20130057471 | A | | 5/2013 |
| WO | 2011111628 | A1 | | 9/2011 |

OTHER PUBLICATIONS

Boonchom, Banjong et al., "Synthesis of new binary cobalt iron pyrophosphate CoFeP2O7," Materials Letters, North Holland Publishing Company, Amsterdam, NL, vol. 63, No. 20, Aug. 15, 2009, pp. 1709-1711.
Li, Huiqiao, et al., "Enhancing the performances of Li-ion batteries by carbon-coating: present and future." Chemical Communications, vol. 48, No. 9, Jan. 1, 2012, pp. 1201-1217.
Marcu, Ioan-Cezar, et al., "Effects of the method of preparing titanium pyrophosphate catalyst on the struture and catalytic activity in oxidative dehydrogenation of n-butane." Journal of Molecular Catalysis A: Chemical 203, No. 1-2, Sep. 1, 2003, pp. 241-250.
Supplemental European Search Report from European Application No. 14 81 4682, dated Aug. 12, 2015.
International Search Report from PCT/KR2014/008160, dated Dec. 17, 2014.
Wang, Shiquan, et al., "Solvothermal synthesis of Mn2P2O7 and its application in lithium-ion battery." Materials Letters, vol. 65, No. 21, Jul. 11, 2011, pp. 3265-3268.
Pang, Huan, et al., "Template-free Controlled Fabrication of NH4MnPO4 H2O and Mn2P2O7 Micro-Nanostructures and Study of Their Electrochemical Properties." International Journal of Electrochemical Science, Dec. 1, 2012, pp. 12340-12353.
Li, Yuerning, et al., "Carbon-Coated Macroporous Sn2P2O7 as Anode Materials for Li-Ion Battery." Journal of Physical Chemistry C., vol. 112, No. 36, Aug. 15, 2008, pp. 14216-14219.

* cited by examiner

TRANSITION METAL-PYROPHOSPHATE ANODE ACTIVE MATERIAL, METHOD OF PREPARING THE SAME, AND LITHIUM SECONDARY BATTERY OR HYBRID CAPACITOR INCLUDING THE ANODE ACTIVE MATERIAL

CROSS-REFERENCE TO RELATED APPLICATIONS

The present application is a continuation of International Application No. PCT/KR2014/008160 filed Sep. 1, 2014, which claims priority from Korean Application No. 10-2013-0106325 filed Sep. 4, 2013, the disclosures of which are hereby incorporated herein by reference.

TECHNICAL FIELD

The present invention relates to a transition metal-pyrophosphate anode active material, a method of preparing the same, and a lithium secondary battery or hybrid capacitor including the transition metal-pyrophosphate anode active material.

BACKGROUND ART

A carbon-based material has been widely used as an anode active material of a typical secondary battery. However, development of new materials has been actively conducted due to the growth of the secondary battery market and the demand on power sources for various applications.

Since high output rather than high energy is required for a typical hybrid electric vehicle, amorphous carbon has been mainly used. However, since the current demand for plug-in hybrid electric vehicles or battery electric vehicles has been increased, the demand for a material having high energy density as well as high power characteristics has been rapidly increased.

Accordingly, oxides of transition metal, MOx (where M=cobalt (Co), iron (Fe), nickel (Ni), copper (Cu), or manganese (Mn)), have received attention as an anode active material having very large capacity.

In particular, development of lithium manganese phosphate ($LiMnO_4$) on the basis of Mn as a lithium transition metal oxide has been actively conducted. With respect to Mn, since Mn may be synthesized in air while the price of a raw material is low, it may be considered as a composition that may satisfy both raw material costs and processing costs.

Since $LiMnPO_4$ has a higher density than a graphite-based material while a theoretical capacity of $LiMnPO_4$ (342 mAh/g) is comparable to that of the graphite-based material (372 mAh/g), $LiMnPO_4$ may have a higher energy density per volume.

However, $LiMnPO_4$ has limitations in that its initial efficiency is low and simultaneously, since Mn has low activity, Mn may not easily react with lithium. In the case that charge and discharge are performed by using an electrode formed of $LiMnPO_4$, capacity may not be fully manifested in a typical operating environment and the reaction may proceed only in the case in which charge and discharge are performed at very low current.

In particular, since a reaction voltage of $LiMnPO_4$ with respect to lithium may be high, a voltage of a battery may be low. Also, since there are limitations in the long-term life of the battery due to volume changes during charge and discharge and the reaction with lithium is slow, the output of the battery may be low.

DISCLOSURE OF THE INVENTION

Technical Problem

The present invention provides an anode active material including a transition metal-pyrophosphate which may exhibit excellent capacity characteristics due to the fact that the anode active material is stable and has good conversion reactivity while including only transition metal and phosphate without using lithium in which the price thereof is continuously increased.

The present invention also provides a method of preparing the transition metal-pyrophosphate.

The present invention also provides an anode including the transition metal-pyrophosphate The present invention also provides a lithium secondary battery or hybrid capacitor including the anode.

Technical Solution

According to an aspect of the present invention, there is provided an anode active material including a transition metal-pyrophosphate of Chemical Formula 1:

$$M_2P_2O_7 \qquad \text{<Chemical Formula 1>}$$

where M is any one selected from the group consisting of titanium (Ti), chromium (Cr), manganese (Mn), iron (Fe), cobalt (Co), nickel (Ni), ruthenium (Ru), palladium (Pd), and silver (Ag), or two or more elements thereof.

According to another aspect of the present invention, there is provided a method of preparing a transition metal-pyrophosphate of Chemical Formula 1 including the steps of: (i) obtaining a precursor including a transition metal-containing compound and a phosphate; and (ii) performing a heat treatment on the precursor obtained in step (i).

According to another aspect of the present invention, there is provided an anode including the transition metal-pyrophosphate.

According to another aspect of the present invention, there is provided a lithium secondary battery or hybrid capacitor including the anode.

Advantageous Effects

Since an anode active material including a transition metal-pyrophosphate according to an embodiment of the present invention is stable and has excellent conversion reactivity while including only transition metal and phosphate without using lithium, the anode active material including a transition metal-pyrophosphate may improve capacity characteristics.

According to an embodiment of the present invention, a carbon coating layer is further included on the transition metal-pyrophosphate. Thus, there is not only an effect of reducing electrode resistance and the formation of a solid electrolyte interface (SEI) due to a decomposition reaction between a solution of an electrolyte solution and an electrolyte salt during charge and discharge of a battery, but also electrical conductivity may be further improved by including the carbon coating layer having excellent conductivity.

Also, since a lithium secondary battery or hybrid capacitor including the anode active material has a linear slope within a discharge voltage range of 0 V to 3 V, the lithium secondary battery or hybrid capacitor including the anode active material may have a lower average voltage than the case of using a typical lithium transition metal oxide-based anode active material. Thus, a voltage of the battery may be increased. In addition, since a voltage curve during charge and discharge is linear with a constant slope, prediction of state of charge (SOC) may be possible. Thus, the lithium secondary battery or hybrid capacitor including the anode active material has great advantages in the application to batteries for electric vehicles or power storage.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

An anode active material according to an embodiment of the present invention includes a transition metal-pyrophosphate of Chemical Formula 1 below:

$M_2P_2O_7$  <Chemical Formula 1> where M is any one selected from the group consisting of titanium (Ti), chromium (Cr), manganese (Mn), iron (Fe), cobalt (Co), nickel (Ni), ruthenium (Ru), palladium (Pd), and silver (Ag), or two or more elements thereof.

Since the anode active material according to the embodiment of the present invention is stable and has excellent conversion reactivity while including only transition metal and phosphate without using lithium in which the price thereof is continuously increased, the anode active material may improve capacity characteristics.

According to an embodiment of the present invention, in the case that the transition metal-pyrophosphate is used as an anode active material, a reaction may be performed on the basis of a conversion reaction such as the following reaction formula 1:

$M_2P_2O_7 + 4Li^+ + 4e^- \rightarrow 2M + Li_4P_2O_7$  <Reaction Formula 1> where M is any one selected from the group consisting of Ti, Cr, Mn, Fe, Co, Ni, Ru, Pd, and Ag, or two or more elements thereof.

In general, a transition metal phosphate has a structure of $MPO_4$. Since the structure by itself is unstable, a hydrate may be formed by the absorption of crystallization water. Thus, there are limitations in using the transition metal phosphate as an electrode material.

However, since the transition metal-pyrophosphate of Chemical Formula 1 and Reaction Formula 1 of the present invention has a stable structure and good conversion reactivity, the transition metal-pyrophosphate of the present invention may realize high capacity when used as an anode active material.

According to an embodiment of the present invention, in Chemical Formula 1 and Reaction Formula 1, M representing a transition metal may be any one selected from the group consisting of Cr, Mn, Fe, Co, Ni, Ru, Pd, and Ag, or two or more elements thereof. In Chemical Formula 1 and Reaction Formula 1, M, for example, may be any one selected from the group consisting of Mn, Ni, Co, and Fe, or two or more elements thereof.

Since the case of M being Mn, Ni, Co, and Fe in Chemical Formula 1 and Reaction Formula 1 is more desirable in terms of cost than the case of M being other metals (e.g., Ti), the case of M being Mn, Ni, Co, and Fe is particularly desirable in terms of cost and mass production. Among them, since the raw material price of Co may be high, M, for example, may be any one selected from the group consisting of Mn, Ni, and Fe, or two or more elements thereof.

Thus, the transition metal-pyrophosphate may include any one selected from the group consisting of $Mn_2P_2O_7$, $Ni_2P_2O_7$, and $Fe_2P_2O_7$, or a mixture of two or more thereof.

According to an embodiment of the present invention, the transition metal-pyrophosphate may be crystalline or semi-crystalline.

However, in the case that the crystalline or semi-crystalline transition metal-pyrophosphate is used in an anode and a secondary battery, the crystalline or semi-crystalline transition metal-pyrophosphate may be converted to an amorphous structure during lithium intercalation after first charge and discharge.

That is, crystallinity of the crystalline or semi-crystalline transition metal-pyrophosphate all disappears, the crystalline or semi-crystalline transition metal-pyrophosphate is converted to an amorphous structure when the secondary battery is subjected to the first charge and discharge, and the crystalline or semi-crystalline transition metal-pyrophosphate may be in a form in which lithium is stored or released in the amorphous structure during subsequent charge and discharge process.

In X-ray diffraction of the crystalline or semi-crystalline transition metal-pyrophosphate, a full width at half-maximum (FWHM) of a diffraction peak having the highest intensity observed in a diffraction angle 2θ range of 20 degrees to 40 degrees, for example, a (021) peak of $Mn_2P_2O_7$ near 28 degrees to 32 degrees, specifically, at 2θ=28.9 degrees, and (212) and (022) peaks of $Ni_2P_2O_7$ at 2θ=29.8 degrees, is in a range of 0.01 degrees to 0.6 degrees, may be in a range of 0.01 degrees to 0.5 degrees, and for example, may be in a range of 0.01 degrees to 0.45 degrees.

In the X-ray diffraction measurement, applied voltage and applied current were respectively set as 40 KV and 40 mA. A measurement range of 2θ was between 10° and 60°, and the XRD measurement was performed by step scanning at an interval of 0.05°. In this case, a variable divergence slit (6 mm) was used and, in order to reduce a background noise due to a polymethyl methacrylate (PMMA) holder, a large PMMA holder (diameter=20 mm) was used. In the present invention, the FWHM quantifies a peak width at a half position of the intensity of the peak obtained by the X-ray diffraction of the transition metal-pyrophosphate.

The FWHM may be represented as degrees (°), i.e., the unit of 2θ, and the higher the crystallinity of the anode active material is, the lower the value of the FWHM is.

Also, in the present invention, the expression "amorphous structure converted after first charge and discharge" may denote that it exhibits no characteristic peak or a broad characteristic peak and has a value greater than the range of the FWHM of the crystalline or semi-crystalline transition metal-pyrophosphate when measurement is performed under the above X-ray diffraction conditions.

An average particle diameter ($D_{50}$) of the transition metal-pyrophosphate according to an embodiment of the present invention may be in a range of 10 nm to 1 μm.

The average particle diameter ($D_{50}$) of the transition metal-pyrophosphate according to the embodiment of the present invention, for example, may be measured by using a laser diffraction method. The laser diffraction method may generally measure a particle diameter ranging from a submicron level to a few mm, and may obtain highly repeatable and high resolution results. The average particle diameter ($D_{50}$) of the transition metal-pyrophosphate may be defined as a particle diameter at 50% in a cumulative particle diameter distribution.

A method of measuring the average particle diameter ($D_{50}$) of the transition metal-pyrophosphate according to an embodiment of the present invention, for example, may be performed in such a manner that the transition metal-pyrophosphate is dispersed in a solution, the solution is introduced into a commercial laser diffraction particle size measurement instrument (e.g., Microtrac MT 3000) and irradiated with ultrasonic waves having a frequency of about kHz and an output of 60 W, and the average particle diameter ($D_{50}$) at 50% in a cumulative particle diameter distribution of the measurement instrument may then be calculated.

In the case that the average particle diameter ($D_{50}$) of the transition metal-pyrophosphate according to the embodiment of the present invention is less than 10 nm, since an initial efficiency of the secondary battery may be decreased due to an increase in specific surface area, battery performance may degrade. In the case in which that the average particle diameter ($D_{50}$) is greater than 1 μm, since packing density is low, a capacity retention ratio may be low.

Also, the anode active material according to the embodiment of the present invention may further include a carbon coating layer on the transition metal-pyrophosphate.

According to an embodiment of the present invention, a carbon coating layer is further included on the transition metal-pyrophosphate, and thus, there may be an effect of reducing electrode resistance and the formation of a solid electrolyte interface (SEI) due to a decomposition reaction between a solution of an electrolyte solution and an electrolyte salt during charge and discharge of a battery. In addition, mechanical properties are further improved to stably maintain a particle shape without breaking the particles during rolling. Also, electrical conductivity may be further improved by including the carbon coating layer having excellent conductivity on outer surfaces of the transition metal-pyrophosphate.

A thickness of the carbon coating layer is in a range of 5 nm to 100 nm and may be in a range of 5 nm to 50 nm. In the case that the thickness of the carbon coating layer is less than 5 nm, an effect of increasing electrical conductivity due to the carbon coating layer may be insignificant and the reactivity with the electrolyte solution during the application of the anode active material may be high. Thus, the initial efficiency may be reduced. In the case in which the thickness of the carbon coating layer is greater than 100 nm, since the thickness of the amorphous carbon coating layer may be excessively increased to act as a barrier to the mobility of lithium ions, resistance may increase and there may be difficulties in electrode processing due to the hard surface.

Also, according to an embodiment of the present invention, the transition metal-pyrophosphate may be in a form of a composite including carbon.

The present invention provides a method of preparing the transition metal-pyrophosphate of Chemical Formula 1 including the steps of: (i) obtaining a precursor including a transition metal-containing compound and a phosphate; and (ii) performing a heat treatment on the precursor obtained in step (i).

Specifically, the method of preparing the transition metal-pyrophosphate according to the embodiment of the present invention may include obtaining a precursor including a transition metal-containing compound and a phosphate (step (i)).

The precursor may be obtained by mixing the transition metal-containing compound and the phosphate so as to satisfy an equivalent ratio. In this case, in order to mix the compounds as well as possible, the precursor, for example, may be uniformly mixed by using a typical milling method such as planetary milling.

According to an embodiment of the present invention, a typically used transition metal-containing compound may be used to prepare the transition metal-pyrophosphate. However, in terms of cost and processing, any one selected from the group consisting of a manganese-containing compound, a cobalt-containing compound, a nickel-containing compound, and an iron-containing compound, or a mixture of two or more thereof may be used.

According to an embodiment of the present invention, any one selected from the group consisting of $MnO_2$, $MnCO_3$, $Mn_3O_4$, and $Mn_2O_3$, or a mixture of two or more thereof may be used as the manganese-containing compound.

According to an embodiment of the present invention, any one selected from the group consisting of $Ni(OH)_2$, NiO, and $NiX_2$ (X=fluorine (F), chlorine (Cl), bromine (Br), or iodine (I)), or a mixture of two or more thereof may be used as the nickel-containing compound.

The cobalt-containing compound may include any one selected from the group consisting of $Co(CH_3COO)_2 \cdot 4H_2O$, $Co(NO_3)_2 \cdot 6H_2O$, $CoCl_2$, CoO, $Co_2O_3$, and $Co_3O_4$, or a mixture of two or more thereof.

Also, the iron-containing compound may include any one selected from the group consisting of $FeSO_4$, $Fe_3O_4$, $FeCO_3$, and FeO, or a mixture of two or more thereof.

The phosphate may include any one selected from the group consisting of $(NH_4)H_2PO_4$, $(NH_4)_2HPO_4$, $(NH_4)_3PO_4$, $H_3PO_4$, $P_2O_5$, $P_4O_{10}$, $Li_3PO_4$, and $FePO_4 \cdot nH_2O$, or a mixture of two or more thereof.

Furthermore, the preparation method of the present invention may include performing a heat treatment on the precursor obtained in step (i) (step (ii)).

The crystalline or semi-crystalline transition metal-pyrophosphate may be obtained by performing a heat treatment on the precursor obtained in step (i) at a temperature of about 300° C. to about 1300° C., more preferably 500° C. to 900° C., and most preferably 600° C. to 800° C.

The heat treatment may be performed in an inert atmosphere, and the inert atmosphere, for example, may be obtained by flowing argon (Ar), nitrogen ($N_2$), or $N_2$+hydrogen ($H_2$) gas in a sintering furnace.

According to an embodiment of the present invention, the method may further include coating the crystalline or semi-crystalline transition metal-pyrophosphate with carbon by mixing the crystalline or semi-crystalline transition metal-pyrophosphate obtained after the heat treatment with a carbon precursor and performing a heat treatment.

A saccharide solution, for example, may be used as the carbon precursor according to an embodiment of the present invention, and any saccharide solution may be used so long as a reaction may proceed by hydrolysis using hydrothermal synthesis.

As a specific example, according to an embodiment of the present invention, the saccharide solution may be a solution including any one selected from the group consisting of glucose, fructose, galactose, sucrose, maltose, and lactose, or a mixture of two or more thereof, and sucrose may be used.

The saccharide solution may be prepared at a concentration of 0.05 M to 0.5 M. Since the concentration of the saccharide solution is a parameter controlling the thickness of the carbon coating layer, the concentration of the saccharide solution may be adjusted in consideration of an amount of the transition metal-pyrophosphate added.

When the saccharide solution is prepared, mixing the saccharide solution with the transition metal-pyrophosphate may be performed. The mixing of the saccharide solution with the transition metal-pyrophosphate may be performed by a typical mixing method, for example, by dispersing and stirring the transition metal-pyrophosphate in the saccharide solution. A uniform carbon coating reaction may be possible only by sufficiently wetting the surface of the transition metal-pyrophosphate with the saccharide solution through uniform dispersion.

According to an embodiment of the present invention, the saccharide solution may be used in an amount of 30 wt % to 80 wt %, for example, 50 wt % to 80 wt % based on a total weight of the transition metal-pyrophosphate.

When the transition metal-pyrophosphate is uniformly dispersed in the saccharide solution, heat treating the saccharide solution including the metal oxide powder, for example, by microwave is performed.

The heat treatment may be performed in a temperature range of 160° C. to 300° C., for example, 200° C. to 270° C. In the case that the heat treatment temperature is less than 160° C., since the formation of the carbon precursor is not easy, the carbon coating layer may be difficult to be formed. In the case in which the heat treatment temperature is greater than 300° C., it is not desirable because the crystal structure of the desired compound may be changed due to excessively high temperature.

Also, the present invention may provide an anode which includes an anode active material including the transition metal-pyrophosphate.

According to an embodiment of the present invention, in the case that the anode active material including the transition metal-pyrophosphate is used in the anode, the crystallinity of the crystalline or semi-crystalline transition metal-pyrophosphate all disappears, the crystalline or semi-crystalline transition metal-pyrophosphate is converted to an amorphous structure when the secondary battery is subjected to the first charge and discharge, and the crystalline or semi-crystalline transition metal-pyrophosphate may be in a form in which lithium is stored or released in the amorphous structure during subsequent charge and discharge process. Also, since the crystalline or semi-crystalline transition metal-pyrophosphate is amorphized, the voltage curve is represented as a straight line with a slope.

With respect to the anode according to the embodiment of the preset invention, since the voltage curve during charge and discharge process has a linear slope, prediction of state of charge (SOC) may be possible. Thus, the anode has great advantages in the application to batteries for electric vehicles or power storage.

The anode active material according to an embodiment of the present invention may be used in the anode by mixing the transition metal-pyrophosphate with a typically used anode active material.

The typically used anode active material may further include any one selected from the group consisting of a carbon-based material, a transition metal oxide, a silicon (Si)-based material, and a tin (Sn)-based material, or two or more active materials thereof, but the present invention is not limited thereto.

Also, the present invention provides a lithium secondary battery or hybrid capacitor including the anode.

The lithium battery or hybrid capacitor, according to an embodiment of the present invention, includes a cathode, an anode, a separator disposed between the cathode and the anode, and an electrolyte.

The anode active material is mixed with a binder, a solvent, and a conductive agent and a dispersant if necessary, and stirred to prepare a slurry. Then, the anode according to the embodiment of the present invention may be prepared by coating a current collector with the slurry and pressing the coated current collector.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with lithium (Li), sodium (Na), and calcium (Ca), or various copolymers, may be used as the binder. N-methyl pyrrolidone, acetone, or water may be used as the solvent.

Any conductive agent may be used without particular limitation so long as it has suitable conductivity without causing adverse chemical changes in the batteries. For example, the conductive agent may include a conductive material such as: graphite such as natural graphite and artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives.

An aqueous-based dispersant or an organic dispersant, such as N-methyl-2-pyrrolidone, may be used as the dispersant.

Similar to the preparation of the anode, a cathode active material, a conductive agent, a binder, and a solvent are mixed to prepare a slurry, and a cathode may then be prepared by directly coating a metal current collector with the slurry or by casting the slurry on a separate support and laminating a cathode active material film separated from the support on a metal current collector.

Examples of the cathode active material may be a layered compound, such as lithium cobalt oxide ($LiCoO_2$), lithium nickel oxide ($LiNiO_2$), $Li[Ni_xCo_yMn_zM_v]O_2$ (where M is any one selected from the group consisting of aluminum (Al), gallium (Ga), and indium (In), or two or more elements thereof; and $0.3 \le x < 0.1$, $0 \le y$, $z \le 0.5$, $0 \le v \le 0.1$, and $x+y+z+v=1$), $Li(Li_aM_{b-a-b}M'_b)O_{2-c}A_c$ (where $0 \le a \le 0.2$, $0.6 \le b \le 1$, $0 \le b' \le 0.2$, and $0 \le c \le 0.2$; M includes Mn and at least one selected from the group consisting of Ni, Co, Fe, Cr, vanadium (V), copper (Cu), zinc (Zn), and Ti; M' is at least one selected from the group consisting of Al, magnesium (Mg), and boron (B); and A is at least one selected from the group consisting of phosphorus (P), F, sulfur (S), and nitrogen (N)), or a compound substituted with at least one transition metal; lithium manganese oxides such as the chemical formula $Li_{1+y}Mn_{2-y}O_4$ (where y ranges from 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxide expressed by the chemical formula $LiNi_{1-y}M_yO_2$ (where M is Co, Mn, Al, Cu, Fe, Mg, B, or Ga, and y ranges from 0.01 to 0.3); lithium manganese complex oxide expressed by the chemical formula $LiMn_{2-y}M_yO_2$ (where M is Co, Ni, Fe, Cr, Zn, or tantalum (Ta), and y ranges from 0.01 to 0.1) or $Li_2Mn_3MO_8$ (where M is Fe, Co, Ni, Cu, or Zn); $LiMn_2O_4$ having a part of Li being substituted with alkaline earth metal ions; a disulfide compound; and a complex oxide formed of $Fe_2(MoO_4)_3$. However, the cathode active material is not limited thereto.

In the cathode active material, as a cathode active material capable of providing a synergistic effect which may further improve the performance of the battery by being used with the anode active material of the present invention, a high voltage cathode may be used, and specific examples of the cathode active material may be lithium nickel oxide ($LiNiO_2$), lithium manganese oxides such as the chemical formula $Li_{1+y}Mn_{2-y}O_4$ (where y ranges from 0 to 0.33), $LiMnO_3$, $LiMn_2O_3$, and $LiMnO_2$; Ni-site type lithium nickel oxide expressed by the chemical formula $LiNi_{1-y}M_yO_2$ (where M is Co, Mn, Al, Cu, Fe, Mg, B, or Ga, and y ranges from 0.01 to 0.3); lithium manganese complex oxide expressed by the chemical formula $LiMn_{2-y}M_yO_2$ (where M is Co, Ni, Fe, Cr, Zn, or Ta, and y ranges from 0.01 to 0.1) or $Li_2Mn_3MO_8$ (where M is Fe, Co, Ni, Cu, or Zn); and $LiMn_2O_4$ having a part of Li being substituted with alkaline earth metal ions.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers, and a polymer separator base material having at least one surface thereof coated with ceramic may be used. However, the present invention is not limited thereto.

In an electrolyte solution used in an embodiment of the present invention, a lithium salt, which may be included as the electrolyte, may be used without limitation so long as it is typically used in an electrolyte solution for a secondary battery. For example, one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In the electrolyte solution used in an embodiment of the present invention, an organic solvent included in the electrolyte solution may be used without limitation so long as it is typically used. Typically, any one selected from the group consisting of propylene carbonate, ethylene carbonate, diethyl carbonate, dimethyl carbonate, ethylmethyl carbonate, methylpropyl carbonate, dipropyl carbonate, fluoroethylene carbonate, dimethyl sulfoxide, acetonitrile, dimethoxyethane, diethoxyethane, vinylene carbonate, sulfolane, γ-butyrolactone, propylene sulfite, tetrahydrofuran, methyl formate, methyl acetate, ethyl acetate, isopropyl acetate, isoamyl acetate, methyl propionate, ethyl propionate, propyl propionate, butyl propionate, methyl butylate, and ethyl butylate, or a mixture of two or more thereof may be used.

In particular, ethylene carbonate and propylene carbonate, ring-type carbonates among the carbonate-based organic solvents, well dissociate the lithium salt in the electrolyte due to high dielectric constants as high-viscosity organic solvents, and thus, the ring-type carbonate may be used. Since an electrolyte having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate, for example, may be used.

Selectively, the electrolyte stored according to the present invention may further include an additive, such as an overcharge inhibitor, included in a typical electrolyte.

Since the voltage curve during charge and discharge of the lithium secondary battery or hybrid capacitor which uses the anode active material including the transition metal-pyrophosphate has a gradual linear slope, a capacity change rate with respect to a voltage in an entire region during discharge is less than 0.3 Ah/V. Thus, a value of differential capacity (dQ/dV) may be less than 0.3 Ah/V Furthermore, the present invention provides an electrochemical cell including the lithium secondary battery or hybrid capacitor as a unit cell.

According to an embodiment of the present invention, since the lithium secondary battery or hybrid capacitor including the anode active material may have a very low average discharge voltage and a small voltage difference during charge and discharge in comparison to the case of using a typical lithium transition metal oxide-based anode active material, the applicability thereof may be high. Also, since the voltage curve during charge and discharge is linear with a constant slope, the prediction of state of charge (SOC) may be possible. Thus, since the lithium secondary battery or hybrid capacitor including the anode active material may be advantageous in terms of the prediction of residual capacity, the lithium secondary battery or hybrid capacitor including the anode active material may have great advantages in the application to batteries for electric vehicles or power storage.

The lithium secondary battery or hybrid capacitor according to the present invention may not only be used in an electrochemical cell that is used as a power source of a small device, but may also be used as a unit cell in a medium and large sized battery module including a plurality of electrochemical cells. Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present inventive concept to those skilled in the art.

EXAMPLES

Preparation of Anode Active Material

Example 1: Preparation of $Mn_2P_2O_7$

Synthesis of $Mn_2P_2O_7$ was performed according to a typical solid reaction method in which precursors were mixed so as to satisfy an equivalent ratio and were heat treated.

$MnO_2$ and $NH_4H_2PO_4$ were weighed in an equivalent ratio of 2:1, and a planetary mill was then used to mix the $MnO_2$ and $NH_4H_2PO_4$ as well as possible. Alumina balls and ethanol as a dispersion medium were added, and milling was then performed at a rate of 350 rpm for 1 hour to obtain a precursor in which raw materials were uniformly mixed.

$Mn_2P_2O_7$ was obtained by heat treating the precursor at 700° C. for 12 hours in air.

Example 2: Preparation of Carbon Layer Coated $Mn_2P_2O_7$

The $Mn_2P_2O_7$ prepared in Example 1 was dispersed in a sucrose solution, and a carbon coating layer was then formed on the $Mn_2P_2O_7$ by microwave heating.

Specifically, the sucrose solution was first prepared in an amount of about 60 wt % based on a total weight of the $Mn_2P_2O_7$. The $Mn_2P_2O_7$ was dispersed in the prepared sucrose solution and stirred for 30 minutes or more. Then, hydrolysis using microwave heating was performed at 200° C. The heat treatment was performed in an argon inert atmosphere. $Mn_2P_2O_7$ coated with a carbon layer through the hydrolysis was washed several times with water and ethanol, and then dried to obtain $Mn_2P_2O_7$ coated with a carbon layer.

Example 3: Preparation of $Ni_2P_2O_7$ $Ni_2P_2O_7$ was obtained in the same manner as in Example 1 except that NiO was used instead of $MnO_2$.

Example 4: Preparation of Carbon Layer Coated $Ni_2P_2O_7$

Carbon layer coated $Ni_2P_2O_7$ was obtained in the same manner as in Example 2 except that $Ni_2P_2O_7$ obtained in Example 3 was used instead of $Mn_2P_2O_7$ obtained in Example 1.

Example 5: Preparation of Carbon Layer Coated $Fe_2P_2O_7$ $Fe_2P_2O_7$ was obtained in the same manner as in Example 2 except that $Fe_2O_3$ was used instead of $MnO_2$.

Preparation of Secondary Battery

Example 6: Preparation of Coin-Type Half Cell

The $Mn_2P_2O_7$ prepared in Example 1 as an anode active material, carbon as a conductive agent, and polyvinylidene fluoride (PVdF) as a binder were mixed at a weight ratio of 80:10:10, and the mixture was mixed with a N-methyl-2-pyrrolidone solvent to prepare a slurry. One surface of a copper current collector was coated with the prepared slurry to a thickness of 30 μm, dried, and rolled. Then, an anode was prepared by drying at 120° C. in a vacuum oven for 12 hours or more.

The anode thus prepared was used to prepare an electrochemical cell. A lithium foil was used as a counter electrode. 1.3 M $LiPF_6$/ethylene carbonate (EC):ethylmethyl carbonate (EMC) (volume ratio 3:7) was used as an electrolyte to prepare a coin-type half cell in an argon atmosphere glove box.

Examples 7 to 10: Preparation of Coin-Type Half Cells

Coin-type half cells were prepared in the same manner as in Example 6 except that the transition metal-pyrophosphates prepared in Examples 2 to 5 were used instead of using the $Mn_2P_2O_7$ prepared in Example 1.

Experimental Example 1: X-Ray Diffraction Analysis

Figure 1:
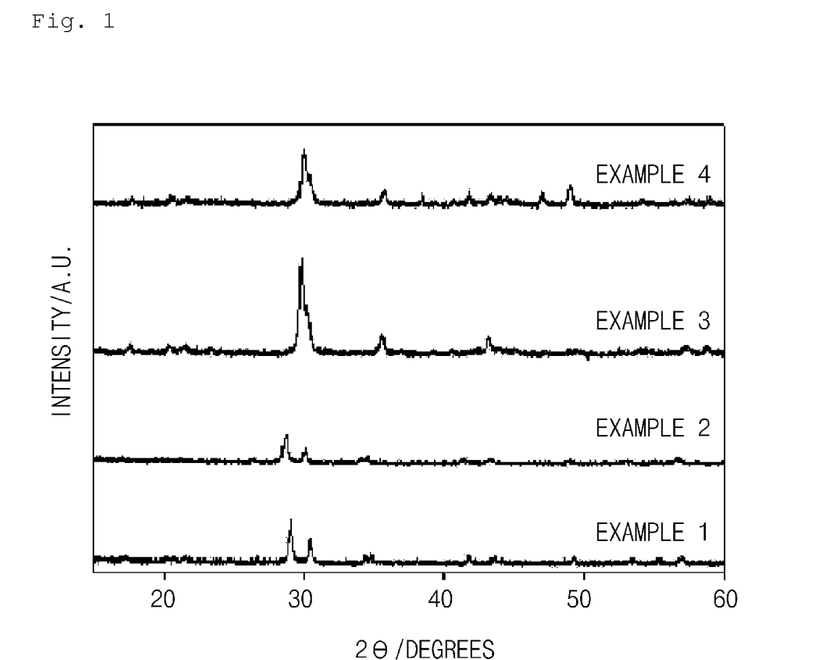
FIG. 1 is a graph illustrating the results of X-ray diffraction analysis of Examples 1 to 4 of the present invention.

An X-ray diffraction (XRD) analysis (Bruker AXS D4-Endeavor XRD) was performed to identify crystallinity of the anode active materials of Examples 1 to 4 prepared according to the present invention, and the results thereof are presented in FIG. 1.

Specifically, applied voltage and applied current were respectively set as 40 KV and 40 mA. A measurement range of 2θ was between 10° and 60°, and the XRD measurement was performed by step scanning at an interval of 0.05°. In this case, a variable divergence slit (6 mm) was used and, in order to reduce a background noise due to a polymethyl methacrylate (PMMA) holder, a large PMMA holder (diameter=20 mm) was used.

As illustrated in FIG. 1, it may be confirmed that Examples 1 to 4 of the present invention had the same crystalline or semi-crystalline structure.

In X-ray diffraction of Examples 1 to 4, a full width at half-maximum (FWHM) of a diffraction peak having the highest intensity observed in a diffraction angle 2θ range of 20 degrees to 40 degrees, i.e., a peak observed near 28 degrees to 32 degrees, was in a range of 0.01 degrees to 0.6 degrees However, since the sizes of the transition metals were different although Examples 1 to 4 had the same structure, it may be confirmed that a slight peak shift occurred.

Experimental Example 2: Scanning Electron Microscope (SEM) Image Analysis

Figure 2:
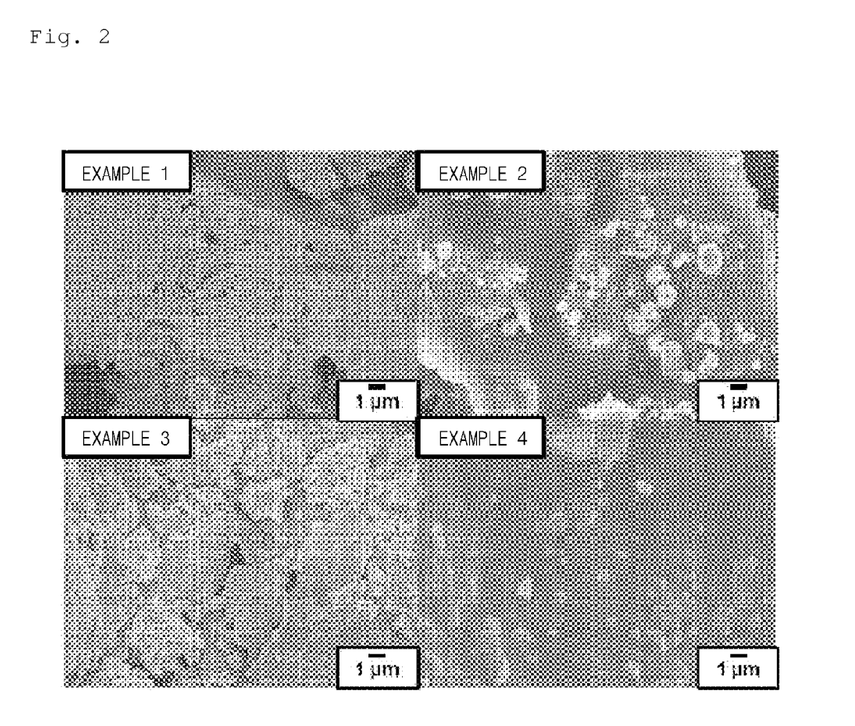
FIG. 2 is images of Examples 1 to 4 of the present invention taken with a scanning electron microscope (SEM)

An SEM image analysis was performed on the anode active materials of Examples 1 to 4, and the results thereof are presented in FIG. 2.

As illustrated in FIG. 2, since the transition metal-pyrophosphates prepared in Examples 1 to 4 were synthesized by a solid-phase method, micron-sized irregular particles were generally formed.

Experimental Example 3: Electrochemical Experiments

Figure 3:
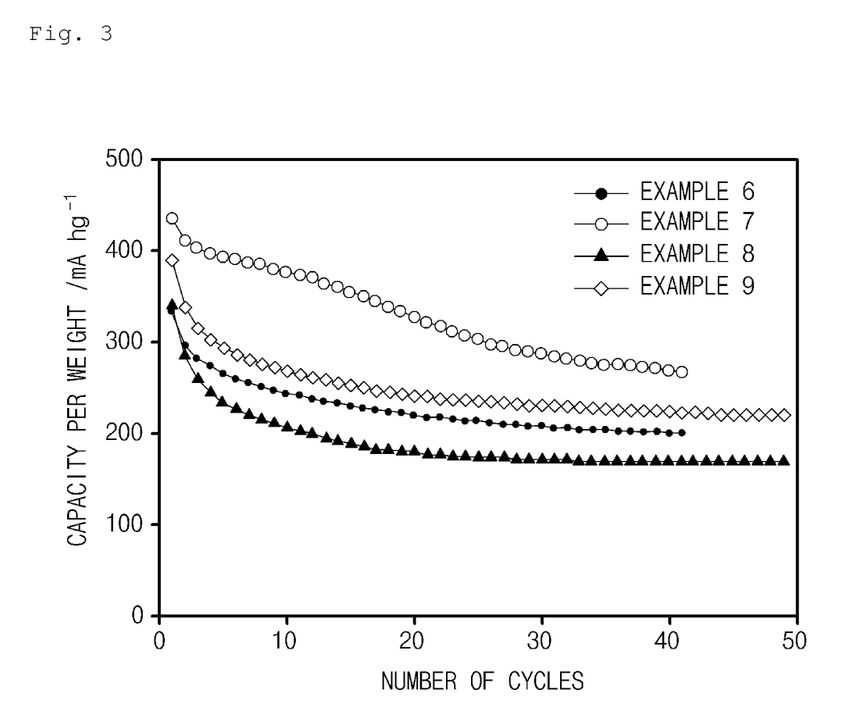
FIG. 3 is a graph illustrating cycle life characteristics from charge and discharge experiments of Examples 6 to 9 of the present invention.

Charge and discharge experiments were performed at a constant current by using the coin-type half cells obtained in Examples 6 to 10, and a resulting graph of capacity per weight vs. the number of cycles is illustrated in FIG. 3. A region of 0 V to 2.5 V (vs. Li/Li+) was used during charge and discharge, and a value of the current used was 25 mA/g.

Referring to FIG. 3, it may be confirmed that initial capacities of the coin-type half cells of Examples 6 to 10 tended to be slightly decreased, but the coin-type half cells of Examples 6 to 10 exhibited behaviors in which the initial capacities were stabilized over the long term according to the increase in the number of cycles.

In particular, with respect to the carbon layer coated $Mn_2P_2O_7$ and $Ni_2P_2O_7$ prepared in Examples 7 to 9, it may be confirmed that the capacities per weight according to the number of cycles were improved by two times or more in comparison to Examples 6 and 8 which were not coated with a carbon layer.

Figure 4:
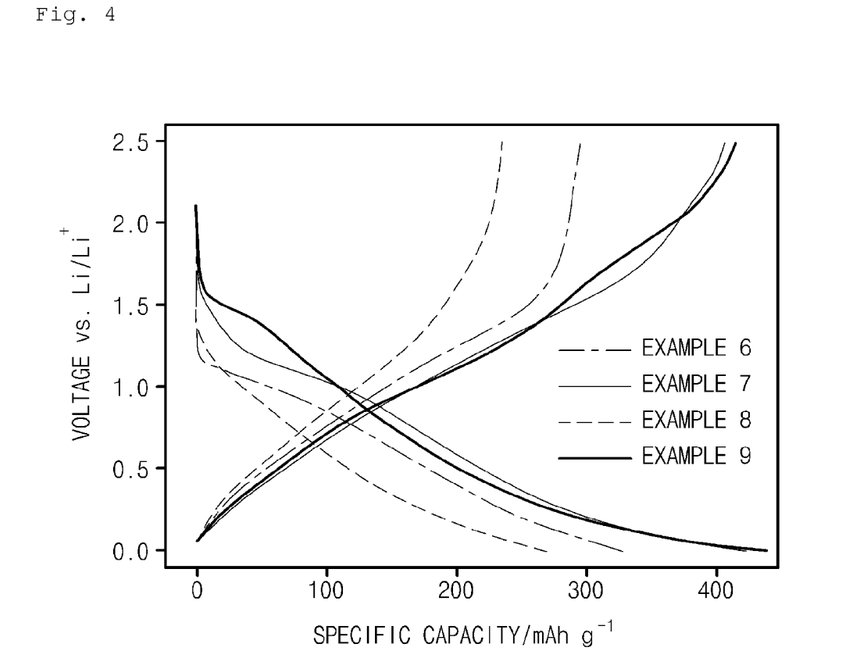
FIG. 4 is a graph illustrating voltage curves with respect to specific capacity from charge and discharge experiments of Examples 6 to 9 of the present invention.

Also, FIG. 4 is a graph illustrating voltage curves with respect to specific capacity from charge and discharge experiments of Examples 6 to 9.

As illustrated in FIG. 4, Examples 6 to 9 had advantages in that average discharge voltages had low values ranging from 0 V to 2.5 V (vs. Li/Li+), which were very low levels among transition metal compounds, and the voltage curves were almost linear with a constant slope. Thus, it may be understood that Examples 5 and 7 may be very advantageous in terms of the prediction of residual capacity.

The invention claimed is:

1. An anode active material consisting of one selected from the group consisting of a transition metal-pyrophosphate of Chemical Formula 1, the transition metal-pyrophosphate of Chemical Formula 1 having a carbon layer thereon, and a composite of the transition metal-pyrophosphate of Chemical Formula 1 and a carbon:

$M_2P_2O_7$  <Chemical Formula 1> where M is any one selected from the group consisting of titanium (Ti), chromium (Cr), cobalt (Co), nickel (Ni), ruthenium (Ru), palladium (Pd), and silver (Ag), or two or more elements thereof.

2. The anode active material of claim 1, wherein, in Chemical Formula 1, M is any one selected from the group consisting of Cr, Co, Ni, Ru, Pd, and Ag, or two or more elements thereof.

3. The anode active material of claim 2, wherein the transition metal-pyrophosphate consists of any one selected from the group consisting of $Ni_2P_2O_7$.

4. The anode active material of claim 1, wherein the transition metal-pyrophosphate is crystalline or semi-crystalline.

5. The anode active material of claim 4, wherein, in X-ray diffraction of the semi-crystalline transition metal-pyrophosphate, a full width at half-maximum (FWHM) of a diffraction peak having a highest intensity observed in a diffraction angle 2θ range of 20 degrees to 40 degrees is in a range of 0.01 degrees to 0.6 degrees.

6. The anode active material of claim 4, wherein the transition metal-pyrophosphate is converted to an amorphous structure after first charge and discharge.

7. The anode active material of claim 1, wherein an average particle diameter (D50) of the transition metal-pyrophosphate is in a range of 10 nm to 1 μm.

8. The anode active material of claim 1, wherein a thickness of the carbon coating layer is in a range of 5 nm to 100 nm.

9. A method of preparing the transition metal-pyrophosphate of Chemical Formula 1 of claim 1, the method comprising steps of:
(i) obtaining a precursor including a transition metal-containing compound and a phosphate; and
(ii) performing a heat treatment on the precursor obtained in step (i).

10. The method of claim 9, wherein the heat treatment is performed in a temperature range of 300° C. to 1300° C.

11. The method of claim 10, wherein the heat treatment is performed in a temperature range of 500° C. to 900° C.

12. The method of claim 9, wherein the transition metal-containing compound comprises any one selected from the group consisting of a cobalt-containing compound, and a nickel-containing compound, or a mixture of two or more thereof.

13. The method of claim 12, wherein the cobalt-containing compound comprises any one selected from the group consisting of $Co(CH_3COO)_2.4H_2O$, $Co(NO_3)_2.6H_2O$, $CoCl_2$, $CoO$, $Co_2O_3$, and $Co_3O_4$, or a mixture of two or more thereof.

14. The method of claim 12, wherein the nickel-containing compound comprises any one selected from the group consisting of $Ni(OH)_2$, $NiO$, and $NiX_2$ (X=fluorine (F), chlorine (Cl), bromine (Br), or iodine (I)), or a mixture of two or more thereof.

15. The method of claim 9, wherein the phosphate comprises any one selected from the group consisting of $(NH_4)H_2PO_4$, $(NH_4)_2HPO_4$, $(NH_4)_3PO_4$, $H_3PO_4$, $P_2O_5$, $P_4O_{10}$, $Li_3PO_4$, and $FePO_4.nH_2O$, or a mixture of two or more thereof.

16. A method of preparing the transition metal-pyrophosphate of Chemical Formula 1 having the carbon layer thereon of claim 1, further comprising:
(i) mixing the transition metal-pyrophosphate of Chemical Formula 1 and a carbon precursor; and
(ii) performing a heat treatment on the mixture in step (i) to coat the transition metal-pyrophosphate with carbon.

17. The method of claim 16, wherein the carbon precursor is a solution including any one selected from the group consisting of glucose, fructose, galactose, sucrose, maltose, and lactose, or a mixture of two or more thereof.

18. The method of claim 16, wherein the carbon precursor is used in an amount of 30 wt % to 80 wt % based on a total weight of the transition metal-pyrophosphate.

19. The method of claim 18, wherein the carbon precursor is used in an amount of 50 wt % to 80 wt % based on the total weight of the transition metal-pyrophosphate.

20. The method of claim 16, wherein the heat treatment in step (iv) is performed in a temperature range of 160° C. to 300° C.

21. An anode comprising the anode active material of claim 1.

22. The anode of claim 21, wherein a voltage curve of the anode during charge and discharge has a linear slope.

23. A lithium secondary battery or hybrid capacitor comprising the anode of claim 21.

24. The lithium secondary battery or hybrid capacitor of claim 23, wherein a capacity change rate of the lithium secondary battery or hybrid capacitor with respect to a voltage in an entire region during discharge is less than 0.3 Ah/V.

25. An electrochemical cell comprising the lithium secondary battery or hybrid capacitor of claim 23 as a unit cell.

* * * * *